(12) United States Patent
Park et al.

(10) Patent No.: US 10,035,425 B2
(45) Date of Patent: Jul. 31, 2018

(54) APPARATUS AND METHOD FOR MANAGING BATTERY IN CONSIDERATION OF REST PERIOD OF BATTERY

(71) Applicant: Samsung Electronics Co., Ltd., Suwon-si (KR)

(72) Inventors: Sang Do Park, Seoul (KR); Myung Hoon Kim, Seoul (KR); Kae Weon You, Hwaseong-si (KR); Jin Yong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/376,958

(22) Filed: Dec. 13, 2016

(65) Prior Publication Data

US 2017/0182906 A1 Jun. 29, 2017

(30) Foreign Application Priority Data

Dec. 24, 2015 (KR) ........................ 10-2015-0186647

(51) Int. Cl.
*H01M 10/48* (2006.01)
*B60L 11/18* (2006.01)
*G07C 5/00* (2006.01)
*G01S 19/01* (2010.01)

(52) U.S. Cl.
CPC ....... *B60L 11/1857* (2013.01); *B60L 11/1861* (2013.01); *G07C 5/008* (2013.01); *G01S 19/01* (2013.01)

(58) Field of Classification Search
CPC . B60L 11/1857; B60L 11/1824; H02J 7/0031; H02J 7/0021; H01M 10/48; H01M 10/4207
See application file for complete search history.

(56) References Cited

U.S. PATENT DOCUMENTS

| | | | |
|---|---|---|---|
| 8,648,603 B2 | 2/2014 | Harada | |
| 9,316,699 B2 | 4/2016 | Baek et al. | |
| 2009/0265125 A1* | 10/2009 | Zhang | H01M 10/4207 702/63 |
| 2010/0121588 A1* | 5/2010 | Elder | H01M 10/48 702/63 |
| 2011/0082621 A1* | 4/2011 | Berkobin | B60L 11/1824 701/31.4 |
| 2014/0092375 A1* | 4/2014 | Raghavan | H01M 10/48 356/32 |
| 2014/0210481 A1 | 7/2014 | Buford | |

(Continued)

FOREIGN PATENT DOCUMENTS

| | | |
|---|---|---|
| JP | 2009-105032 A | 5/2009 |
| JP | 2013-61225 A | 4/2013 |

(Continued)

*Primary Examiner* — Yuri Kan
(74) *Attorney, Agent, or Firm* — NSIP Law

(57) ABSTRACT

Apparatuses and methods for estimating a state of a battery in a battery management system is provided. A battery management apparatus includes a rest period detector configured to detect a rest period of a battery, an environment information collector configured to collect environment information during the rest period, and a state of health (SOH) determiner configured to determine an SOH of the battery based on the collected environment information.

20 Claims, 11 Drawing Sheets

| | SOC% | -22 °C | 25 °C | 60 °C | 75 °C |
|---|---|---|---|---|---|
| CAPACITY MAINTENANCE RATE (%) | SOC 33% | 96.31% | 96.60% | 95.51% | 93.95% |
| | SOC 66% | 95.60% | 95.95% | 94.96% | 92.21% |
| | SOC 99% | 95.61% | 94.59% | 96.75% | 92.91% |
| RESISTANCE INCREASING RATE (%) | SOC 33% | 9.97% | 10.19% | 11.72% | 13.44% |
| | SOC 66% | 10.29% | 11.36% | 12.64% | 18.74% |
| | SOC 99% | 10.46% | 10.86% | 16.11% | 30.79% |

(56) References Cited

U.S. PATENT DOCUMENTS

| | | | | |
|---|---|---|---|---|
| 2015/0030891 A1* | 1/2015 | Sholklapper | .......... | H01M 10/48 |
| | | | | 429/50 |
| 2015/0369874 A1 | 12/2015 | Park et al. | | |
| 2016/0190833 A1* | 6/2016 | Roumi | .................. | H02J 7/0021 |
| | | | | 320/136 |
| 2017/0187207 A1* | 6/2017 | Li | ........................ | H02J 7/0031 |

FOREIGN PATENT DOCUMENTS

| | | |
|---|---|---|
| KR | 10-2006-0020965 A | 3/2006 |
| KR | 10-1304308 B1 | 9/2013 |
| KR | 10-2013-0113296 A | 10/2013 |
| KR | 10-2016-0000317 A | 1/2016 |

* cited by examiner

FIG. 1

|  | SOC% | -22 ℃ | 25 ℃ | 60 ℃ | 75 ℃ |
|---|---|---|---|---|---|
| CAPACITY MAINTENANCE RATE (%) | SOC 33% | 96.31% | 96.60% | 95.51% | 93.95% |
|  | SOC 66% | 95.60% | 95.95% | 94.96% | 92.21% |
|  | SOC 99% | 95.61% | 94.59% | 96.75% | 92.91% |
| RESISTANCE INCREASING RATE (%) | SOC 33% | 9.97% | 10.19% | 11.72% | 13.44% |
|  | SOC 66% | 10.29% | 11.36% | 12.64% | 18.74% |
|  | SOC 99% | 10.46% | 10.86% | 16.11% | 30.79% |

A: BATTERY DISCHARGING PERIOD
B: BATTERY REST PERIOD
C: BATTERY CHARGING PERIOD

APPARATUS AND METHOD FOR MANAGING BATTERY IN CONSIDERATION OF REST PERIOD OF BATTERY

CROSS-REFERENCE TO RELATED APPLICATION(S)

This application claims the benefit under 35 USC § 119(a) of Korean Patent Application No. 10-2015-0186647, filed on Dec. 24, 2015, in the Korean Intellectual Property Office, the entire disclosure of which is incorporated herein by reference for all purposes.

BACKGROUND

Field

The following description relates to estimating a state of a battery in a battery management system.

Description of Related Art

A battery management apparatus can estimate a state of charge (SOC) of a battery and a state of health (SOH) of the battery. Generally, an SOH of a battery is estimated based on a life cycle of a battery pack, and the state of the battery can be estimated based on sensing data generated while charging and discharging the battery.

When sensing voltage, current, and temperature data through a sensor in a battery pack, the reduction of a capacity of the battery can be estimated, and the SOH of the battery can be estimated. A battery is discharged by a predetermined amount even in a standby state and since the SOH of the battery is not estimated when the battery management system is not operated, the reduced amount of an SOH of the battery in a natural discharge period is not be properly reflected.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided a battery management apparatus including a processor configured to detect a rest period of a battery; collect environment information during the rest period; and determine an state of health (SOH) of the battery based on the collected environment information.

According to another general aspect, a battery management apparatus, wherein the processor includes a rest period detector configured to detect the rest period of the battery; an environment information collector configured to collect the environment information during the rest period; and a state of health (SOH) determiner configured to determine the SOH of the battery based on the collected environment information.

The rest period detector may be further configured to detect the rest period of the battery, in response to an ignition switch of a vehicle being turned off.

The rest period detector may be further configured to detect a period in which the battery is in a standby state or a period in which the battery management apparatus is not operated as the rest period.

The environment information collector may be further configured to transmit position information of a vehicle and the rest period of the battery to a server, and to collect ambient environment information corresponding to the position information during the rest period from the server.

The environment information collector may be further configured to periodically receive position information from a global positioning system (GPS), or to use a last position information acquired before the rest period.

The ambient environment information may include any one or any combination of a temperature, a humidity, and a fine dust concentration.

The environment information collector may be further configured to collect internal environment information of the battery through a sensor.

The environment information collector may be further configured to set the battery management apparatus to periodically wake up during the rest period and to collect the internal environment information of the battery.

The environment information collector may be further configured to periodically operate the environment information collector to collect the internal environment information of the battery, in response to the battery management apparatus not being operated.

The SOH determiner may be further configured to determine the SOH using data input during a usage period of the battery, and to update the determined SOH of the battery based on a state of charge (SOC) of the battery maintained during the rest period and the collected environment information.

The SOH determiner may include a preprocessor configured to preprocess any one or any combination of the SOC of the battery maintained during the rest period and the collected environment information as a histogram representing a cumulative frequency distribution for each data interval.

The preprocessor may be further configured to calculate the SOC of the battery maintained during the rest period from an SOC before the rest period and an SOC after the rest period using linear interpolation.

The preprocessor may be further configured to calculate a decreasing rate of the SOC of the battery maintained during the rest period using a relationship between the rest period and temperature data of the battery in the collected environment information.

The SOH determiner may be further configured to set the histogram of the preprocessed SOC of the battery and the histogram of the preprocessed environment information as a parameter reflecting a degree of aging during the rest period.

According to another general aspect, a battery management method, includes detecting a rest period of a battery; collecting environment information during the rest period; and determining a state of health (SOH) of the battery based on the collected environment information.

The collecting of the environment information may include transmitting position information of a vehicle and the rest period of the battery to a server, and collecting ambient environment information corresponding to the position information during the rest period from the server.

The collecting of the environment information may include operating a sensor to collect internal environment information of the battery.

The determining of the SOH of the battery may include estimating the SOH using data input during a usage period of the battery; and updating the estimated SOH of the battery based on a state of charge (SOC) of the battery maintained during the rest period and the collected environment information.

The determining of the SOH of the battery may further include calculating the SOC of the battery maintained during the rest period from an SOC before the rest period and an SOC after the rest period using linear interpolation.

The determining of the SOH of the battery may include preprocessing any one or any combination of the SOC of the battery maintained during the rest period and the collected environment information as a histogram representing a cumulative frequency distribution for each data interval.

The determining of the SOH of the battery may include setting a histogram of the preprocessed SOC of the battery and a histogram of the preprocessed environment information as a parameter reflecting an aging degree during the rest period.

A non-transitory computer-readable storage medium may store instructions that, when executed by a processor, cause the processor to perform the method.

Other features and aspects will be apparent from the following detailed description, the drawings, and the claims.

BRIEF DESCRIPTION OF THE DRAWINGS

FIG. 1 is a diagram illustrating an example of a table illustrating a relationship between a capacity maintenance rate and a resistance increasing rate of a state of charge (SOC) of a battery according to the SOC of the battery and a temperature condition during a rest period of the battery.

Figure 2:
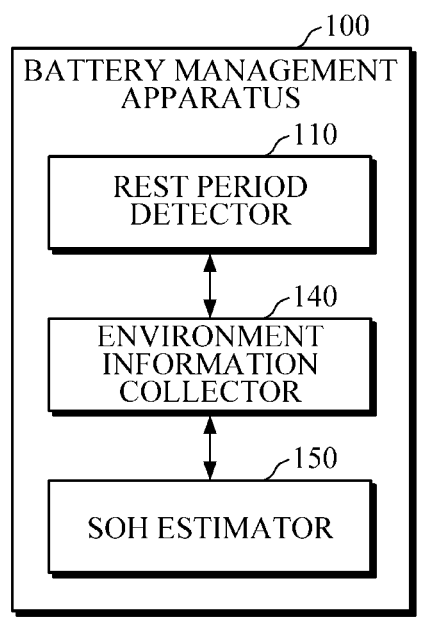
FIG. 2 is a diagram illustrating an example of a battery management apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or apparatuses described herein. However, various changes, modifications, and equivalents of the methods, apparatuses, and/or apparatuses described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

FIG. 1 is an example of a table illustrating a relationship between a capacity maintenance rate (%) and a resistance increasing rate (%) of a state of charge (SOC) of a battery according to the SOC of the battery and a temperature condition during a rest period of the battery. For example, referring to FIG. 1, when the SOC of the battery is charged to 33%, it may be seen that a meaningful change occurs in the capacity maintenance rate (%) of the SOC of the battery according to the temperature condition when the capacity maintenance rate (%) of the SOC of the battery is calculated after leaving it for 48 hours by keeping a temperature condition as −22, 25, 60, and 75 degrees. Further, when the SOC of the battery is varied to 33%, 66%, 99% at the same temperature condition, the capacity maintenance rate (%) of the SOC of the battery is different. Likewise, referring to FIG. 1, a meaningful change also occurs in the resistance increasing rate (%) when maintaining the SOC of the battery and changing the temperature condition, and when maintaining the temperature condition and changing the SOC of the battery.

As an example, when the battery is maintained in a standby state for a predetermined time, a resistance may increase, and the capacity maintenance rate of the SOC of the battery may decrease. The battery management apparatus 100 may calculate the capacity maintenance rate and the resistance increasing rate using the SOC of the battery and the temperature condition in which the battery is allowed to stand, and estimate a degree to which the battery ages during the rest period of the battery.

The battery is not used during the rest period of the battery but the battery may be naturally discharged in the standby state, and in this case, the degree to which the battery ages may be changed by an influence of an ambient climatic environment. When considering that the battery is used in a global environment, the SOH of the battery may be more precisely estimated when it reflects ambient environment information.

FIG. 2 is a diagram of a battery management apparatus according to an embodiment. In an example, the battery management apparatus 100 includes a rest period detector 110, an environment information collector 140, and a state of health (SOH) estimator 150.

Hereinafter, battery management apparatus 100 is described with reference to an Electric Vehicle (EV). However, the EV is a non-exhaustive example, and it should be understood that the battery management apparatus 100 is also used for managing a battery pack of a plug-in hybrid EV (PHEV), a hybrid EV (HEV), smart appliance, an intelligent vehicle, a smart home environment, a smart building environment, a secondary battery, a battery cell, or any battery module capable of being charged and discharged as an energy source. The battery module capable of being charged and discharged may be embedded in or interoperate with various digital devices such as, for example, a mobile phone, a cellular phone, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a necklace, an earring, a headband, a helmet, a device embedded in the cloths, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

In an example, the rest period detector 110 detects a rest period of a battery. As an example, when an ignition switch of an electric vehicle (EV) is turned on, the rest period detector 110 may detect the rest period of the battery. For example, the rest period may be at least one of a period in which the battery is allowed to stand in the standby state and a period in which the battery management apparatus 100 is not operated.

As one example, when the battery is reactivated, the rest period detector 110 detects the standby period of the battery or the period in which the battery is allowed to stand in the rest period. As another example, the rest period detector 110 may detect the period in which the battery management apparatus 100 is not operated or a period in which the battery management apparatus 100 is operated but the SOC of the battery is not estimated as the rest period.

In an example, the rest period of the battery is a state in which power of the battery management apparatus 100 is turned-off. However, when the power of the battery management apparatus 100 is turned on, the rest period detector 100 may detect a time at which the battery management apparatus 100 is deactivated to a time at which the battery management apparatus 100 is reactivated as the rest period of the battery.

Figure 4:
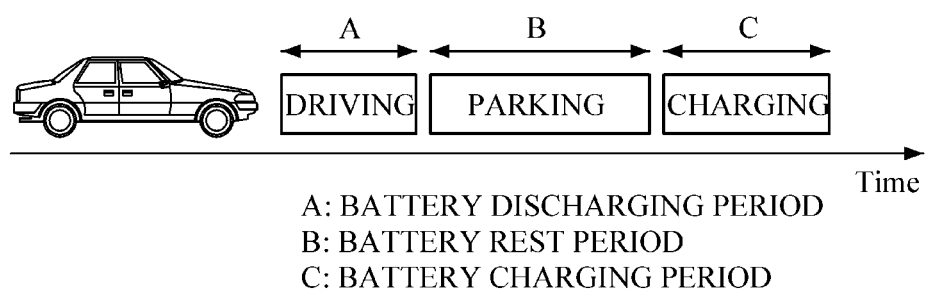
FIG. 4 is a diagram illustrating an example of classifying a rest period of a battery according to an operation of an electric vehicle (EV).

FIG. 4 is an example of classifying a rest period of a battery according to an operation of an EV. A period A in which the EV is driven using a battery pack may be a battery discharging period, and a period C in which the battery of the EV is charged may be a battery charging period. In this case, since the battery is used by the charging and discharging of the battery in the periods A and C, the periods A and C may be classified as a usage period of the battery.

The EV is turned off while parked, and power of the battery pack and a battery management system (BMS) is turned off. In this case, the battery may be maintained to be in the standby state. A period B in which the EV is parked may be classified as the rest period of the battery in which the battery is not used according to the driving of the EV.

In an example, the environment information collector 140 collects environment information during the rest period. For example, when the battery management apparatus 100 is operated, the environment information collector 140 collects ambient environment information or internal environment information during the rest period.

According to an example, the environment information collector 140 transmits position information and rest period information of the EV to a server, and collects ambient environment information corresponding to position information from the server. For example, the environment information collector 140 may periodically receive a position of the EV from a global positioning system (GPS) or wireless-fidelity (Wi-Fi). In an example, the environment information collector 140 uses the last position information of the EV from the GPS or by using the Wi-Fi, before the EV is turned off.

According to an example, the environment information collector 140 operates a sensor in the battery to collect the internal environment information. As one example, the environment information collector 140 collects the internal environment information by setting the battery management apparatus 100 to periodically wake-up during the rest period. As another example, the environment information collector 140 collects the internal environment information by setting the sensor in the battery to periodically sense data even when the battery management apparatus 100 is not operated. In an example, when the battery is used lesser that a threshold value or when the battery management apparatus 100 is woken up within a predetermined time, the rest period of the battery may be considered to be maintained.

In an example, the SOH estimator 150 estimates an SOH of the battery based on the collected environment information. The SOH of the battery may be parameters such as, for example, battery deterioration, battery harshness represented as a numerical value related to a life span of the battery. When the battery is maintained in the standby state for a long time, the life span of the battery is decreased, and the SOH of the battery may be more precisely estimated when reflecting a state change during the rest period of the battery.

For example, when comparing a case in which the EV is parked outside in a sub-zero temperature in winter and the battery is allowed to stand during a predetermined time and a case in which the EV is parked inside in summer and the battery is allowed to stand during the predetermined time, the battery harshness which has an effect on the life span of the battery may be different according to the temperature of the ambient environment. In this case, the SOH estimator 150 may estimate the SOH of the battery by reflecting the aging degree of the battery during the rest period based on temperature data collected as the ambient environment information.

An accurate estimation of the SOH of the battery is needed to determine a battery replacement period. Since the state of the battery may change even during the rest period in which the battery is maintained in the standby state, accuracy of the estimation of the SOH of the battery is increased by reflecting the degree to which the battery ages during the rest period. A detailed description of the SOH estimator 150 is provided with reference to FIG. 3.

Figure 3:
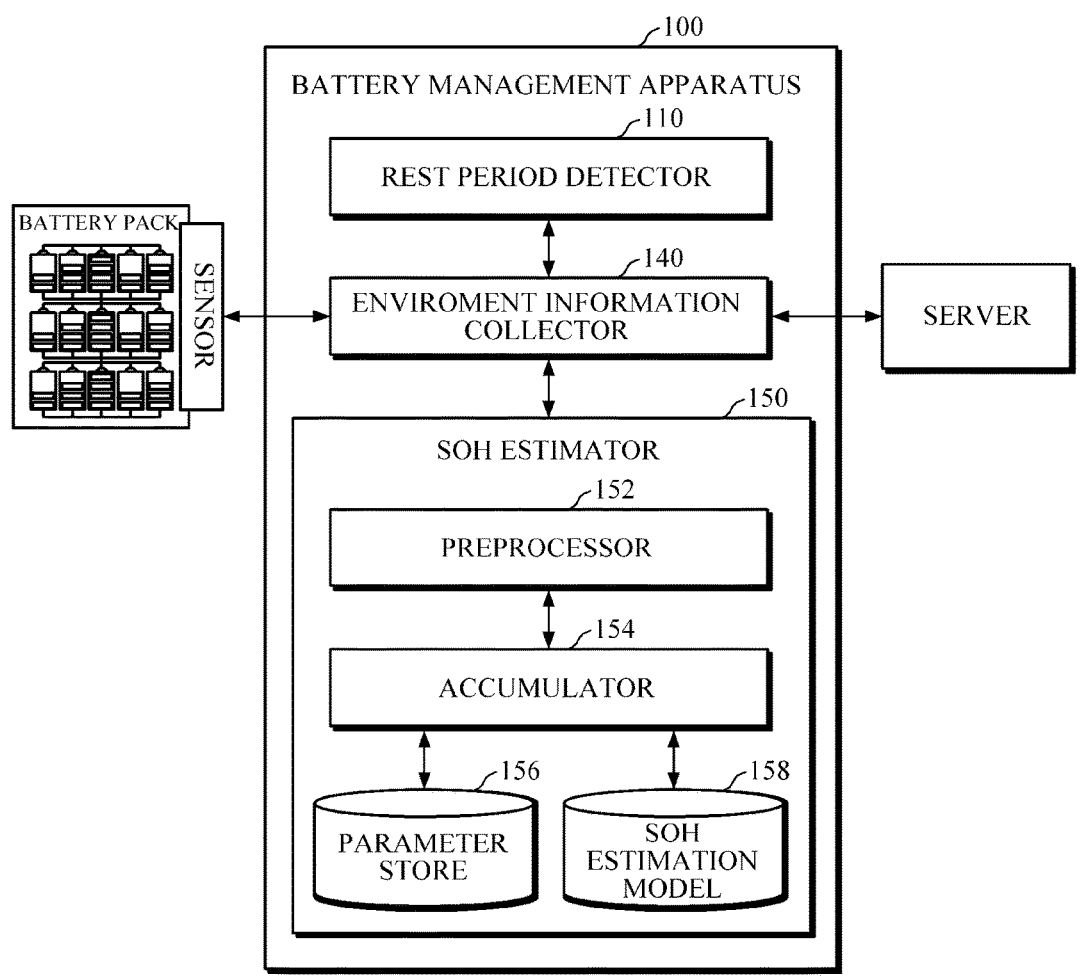
FIG. 3 is a diagram illustrating an example of the battery management apparatus.

FIG. 3 is a diagram illustrating an example of the battery management apparatus 100. The battery management apparatus 100 includes the rest period detector 110, the environment information collector 140, and the SOH estimator 150. Some of the components shown in FIG. 3 have been described with reference to FIGS. 1-2. The above description of FIGS. 1-2, is also applicable to FIG. 3, and is incorporated herein by reference. Thus, the above description may not be repeated here.

According to an embodiment, the environment information collector 140 transmits position information and battery rest period information (the battery standby period) of an EV to an external server, and collects ambient environment information from the server during a rest period. For example, when the EV is parked and a predetermined time passes, temperature data according to a time and a date of a region at which the EV is located may be collected. In this case, the ambient environment information may include temperature information and weather information of the region in which the EV is located. For example, the ambient environment information may include data such as, for example, temperature, humidity, and fine dust concentration. In another example, the environment information collector 140 may collect ambient environment information through sensors disposed on the battery, environment information collector 140, or the EV.

The environment information collector 140 may communicate with the external server, for example, a meteorological office, a portal site, and so on, using a wired or wireless method. Further, the environment information collector 140 may collect the ambient environment information from a dedicated server operated by a manufacturer of the EV. The type of the server, an operator, the obtained information, etc. are not limited, and can be varied without departing from the spirit and scope of the illustrative examples described. Further, the ambient environment information may be collected when a BMS is operated after the rest period of the battery.

Figure 5:
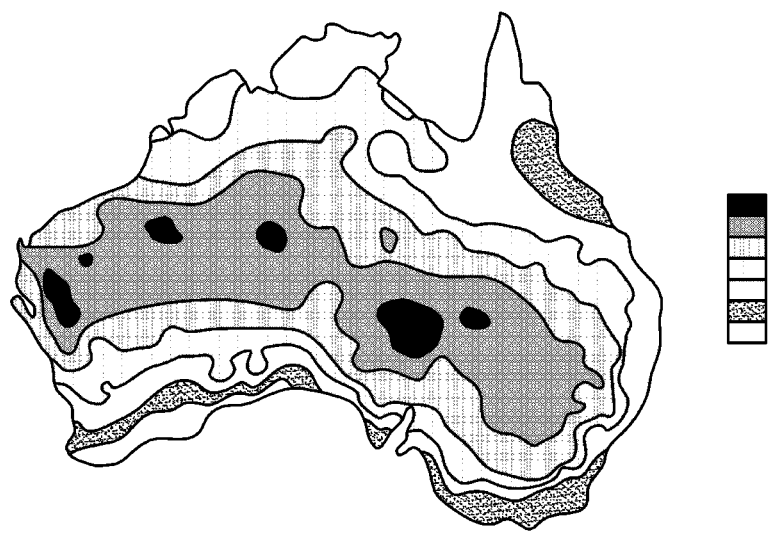
FIG. 5 is a diagram illustrating an example regarding a temperature distribution of a region in which an EV is located.

FIG. 5 illustrates an example regarding a temperature distribution of a region in which an EV is located. FIG. 5 illustrates a map of Australia, and is an example illustrating a temperature distribution in Australia as isotherms. When obtaining position information of the EV, the environment information collector 140 may collect temperature data corresponding to the position information from an external server during the rest period.

In an example, the environment information collector 140 includes a method for modifying ambient environment information collected from the server to be able to apply it to an inside area when the EV is parked in the inside area. The kind of the ambient environment information that is collected and a collection method of the environment information collector 140 may vary without departing from the spirit and scope of the illustrative examples described.

According to an example, the environment information collector 140 may operate a sensor in a battery during the rest period of the battery, and collect internal environment information of the battery. When the battery management apparatus 100 is operated, an internal temperature of the battery is sensed by the sensor, but the battery management apparatus 100 may not be operated during the rest period of the battery.

In one example, the environment information collector 140 collects the internal environment information of the battery by setting the battery management apparatus 100 to wake-up periodically. In another example, the environment information collector 140 may collect the internal environment information of the battery by setting the sensor in the battery to periodically sense data even when the battery management apparatus 100 is not operated. In an example, the environment information collector 140 designates a sensing data store separate from the battery management apparatus 100, and read the temperature data collected during the rest period from the sensing data store when the battery management apparatus 100 is operated. In an example, the sensing data store may be integrated with the battery management apparatus 100.

The SOH estimator 150 includes a preprocessor 152, an accumulator 154, a parameter store 156, and an SOH estimation model 158. The SOH estimator 150 estimates an SOH using data input during a usage period of the battery, and updates the estimated SOH of the battery based on an SOC of the battery maintained during the rest period and the collected environment information.

According to an embodiment, the SOH estimation model 158 may be an estimation model based on at least one of a neural network (NN), a deep neural network (DNN), a restricted Boltzmann machine (RBM). The SOH estimator 150 may estimate the SOC of the battery during the usage period of the battery, and learn the estimated SOH of the battery.

For example, the SOH estimator 150 may preprocess a voltage, a current, and the temperature data sensed in the battery during the usage period of the battery in the form of a histogram, and estimate the SOH of the battery by inputting the histogram to the SOH estimation model 158.

Figure 6:
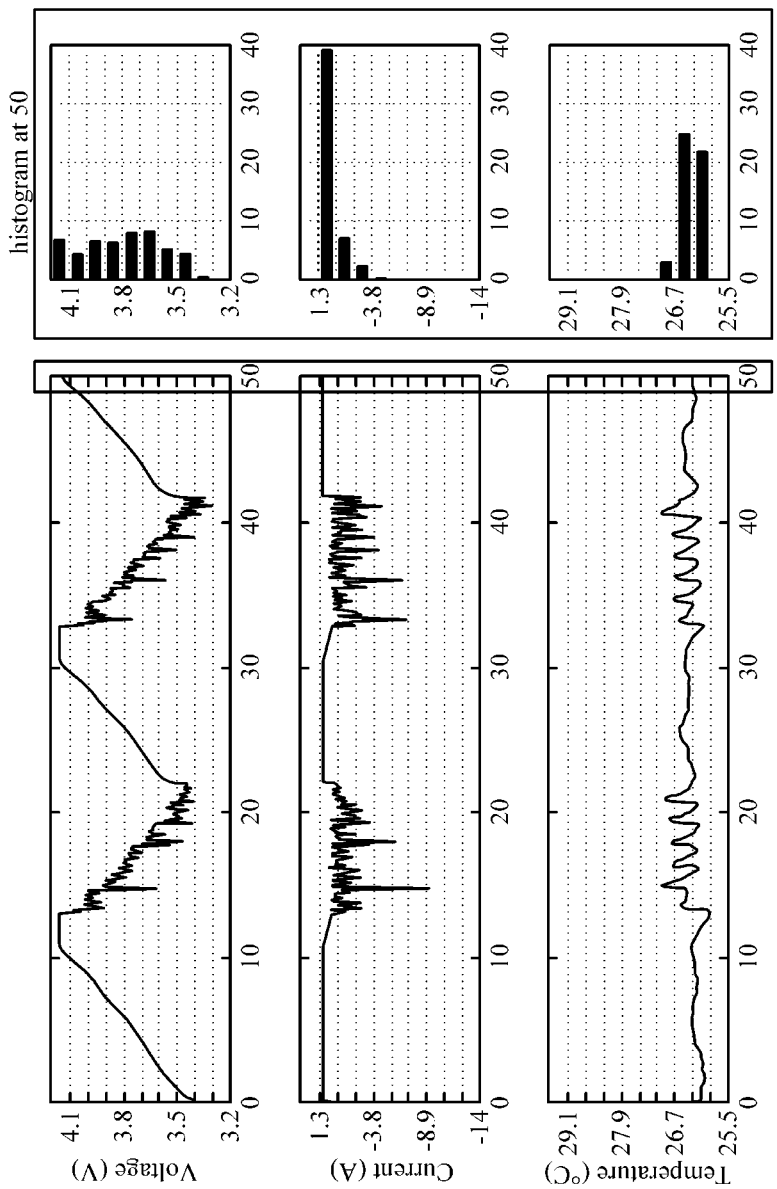
FIG. 6 is a diagram illustrating an example of preprocessing voltage, current, and temperature data in the form of a histogram.

FIG. 6 illustrates an example of preprocessing a voltage, a current, and temperature data in the form of a histogram. As an example, the preprocessor 152 senses a charging state and a discharging state of a battery through a charging and discharging sensor in the battery, and divides the sensed voltage, current, and temperature data into data intervals, respectively (the intervals may not be equal). In an example, the preprocessor 152 determines the data interval based on the charging state and the discharging state of the battery, and preprocess the sensed voltage, current, and temperature data in the form of a histogram representing a cumulative frequency distribution for each interval.

A graph shown at the left side of FIG. 6 is an example illustrating voltage, current, and temperature graphs according to a time. The preprocessor 152 may divide a voltage of from 0V to 4.2V into a plurality of data intervals on a time-voltage graph, cumulatively count how many seconds the voltage data is sustained within a single voltage data interval, and represent a time duration frequency for a specific data interval. The preprocessor 152 may count the time duration frequency for an entire voltage data interval, and convert the voltage data input to the preprocessor 152 into the form of the histogram.

As shown at the left side of FIG. 6, the preprocessor 152 may cumulatively count a current duration time and a temperature duration time for each data interval on a time-current graph and a time-temperature graph, and convert the current and temperature data according to the time input to the preprocessor 152 into the form of a current histogram and a temperature histogram, respectively.

In an example, the sensing data input to the preprocessor 152 may be a data value and not the form of the graph shown in the embodiment of FIG. 6. Further, the preprocessor 152 may convert the data into the form of another type of histogram and not into the form of the bar-type histogram shown in the embodiment of FIG. 6, and also may convert the data into a data value itself representing the cumulative frequency and not into the form of a histogram. In addition to the embodiment described above, a data form input and output through the preprocessor 152 may vary without departing from the spirit and scope of the illustrative examples described.

In an example, the preprocessor 152 preprocesses the SOC of the battery maintained during the rest period of the battery and the temperature data collected as the environment information in the form of the histogram. For example, the SOC of the battery may be estimated while the battery management apparatus 100 is operated, and the SOC of the battery may be calculated right before and right after the rest period of the battery.

Moreover, the preprocessor 152 may calculate the capacity maintenance rate (%) after a predetermined time passes from the SOC of the battery right before the rest period of the battery using relationship information of the relationship between the rest period of the battery (the battery standby time) and the temperature data collected as the environment information. In an example, the relationship information between the rest period of the battery and the temperature data is previously measured. In another example, the relationship information between the rest period of the battery and the temperature data is input.

In an example, the preprocessor 152 calculates the SOC of the battery maintained during the rest period, and generates a battery SOC graph in which the SOC of the battery gradually decreases from an SOC of the battery right before the rest period. In an example, the preprocessor 152 calculates the SOC of the battery maintained during the rest period using linear interpolation from the SOC right before and an SOC right after the rest period. In an example, a decreasing rate of the SOC of the battery may be calculated based on the relationship information between the rest period and the temperature data. When the SOC of the battery maintained during the rest period is calculated, the preprocessor 152 may divide the SOC of the battery into the data intervals, and generate a battery SOC histogram of the rest period by cumulatively counting a time in which the SOC of the battery is sustained for each data interval.

Moreover, when the temperature data of the battery is periodically collected through the environment information collector 140, the preprocessor 152 may estimate the temperature data according to the lapse of time during the rest period based on the collected temperature data. The preprocessor 152 may generate the time-temperature graph during the rest period, divide the temperature into the temperature data intervals, cumulatively count a duration time for each temperature data interval, and generate the temperature histogram during the rest period.

In an example, the accumulator 154 accumulates the voltage histogram, the current histogram, and the temperature histogram preprocessed during the usage period of the battery, and the battery SOC histogram during the rest period and the temperature histogram during the rest period preprocessed after the rest period. The accumulator 154 may input the accumulated histograms to the SOH estimation model 158, and store the preprocessed histograms in the parameter store 156 as parameters of the SOH estimation model 158. In an example, the accumulator 154 may set the preprocessed battery SOC histogram and the preprocessed environment information histogram, which are generated during the rest period, as a weight parameter reflecting the aging degree during the rest period.

The SOH estimation model 158 may estimate the SOH of the battery during the usage period of the battery, and when the rest period of the battery is generated, reflect the aging degree of the battery on the estimation of the SOH using the environment information collected during the rest period.

Figure 7:
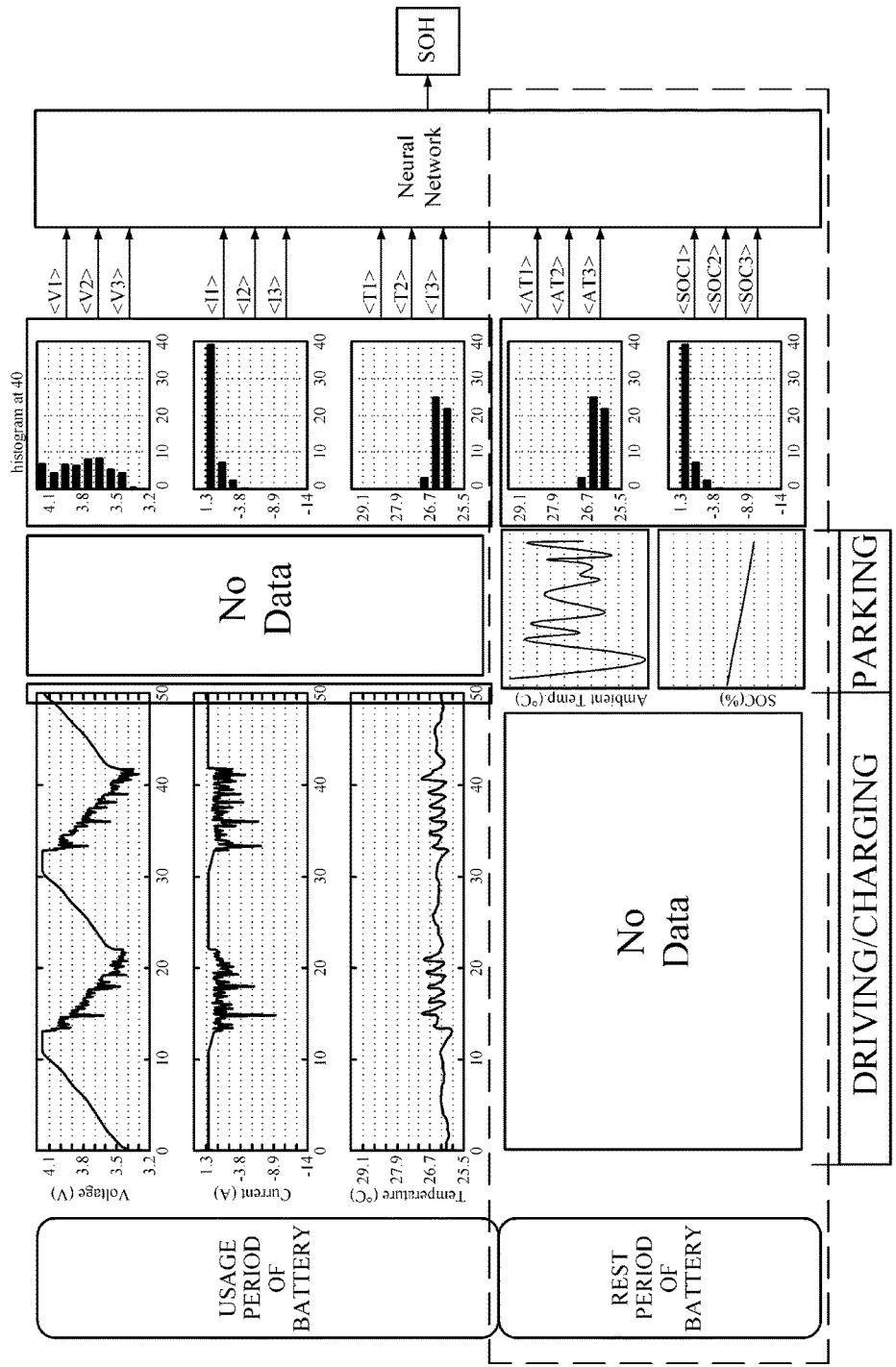
FIG. 7 is a diagram illustrating an example for describing a data processing operation according to a usage period and a rest period of a battery.

FIG. 7 is a diagram illustrating an example for describing a data processing operation according to a usage period and a rest period of a battery. Referring to FIGS. 3 and 7, an example regarding a data processing operation according to the usage period and the rest period of the battery in the battery management apparatus 100 will be described.

Referring to FIG. 7, in an example, voltage, current, and temperature data in the battery is obtained through a sensor during the usage period of the battery. The preprocessor 152 may preprocess the voltage, current, and temperature data obtained during the usage period of the battery in the form of a histogram, and the accumulator 154 may input a cumulative frequency value for each data interval to the SOH estimation model 158 based on an NN. The SOH estimation model 158 based on the NN may estimate an SOH of the battery during the usage period of the battery.

Since the battery management apparatus 100 is not operated during the rest period of the battery, the voltage, current, and temperature data in the battery may not be obtained. According to an example, the rest period of the battery may be a state in which the power of the battery management apparatus 100 is turned off. When the power of the battery management apparatus 100 is turned on, the rest period detector 110 may detect the rest period of the battery, and the environment information collector 140 may collect the temperature data as the environment information during the rest period of the battery.

Referring to FIG. 7, the preprocessor 152 may modify a time at which the temperature data is not collected during the rest period based on the collected temperature data, estimate an ambient temperature (° C.) according to the elapsed time during the rest period of the battery, and generate a time-ambient temperature graph. The time-ambient temperature graph during the rest period of the battery and a temperature histogram during the rest period in which the preprocessor 152 preprocesses the time-ambient temperature graph in the form of a histogram are illustrated in FIG. 7.

In an example, the preprocessor 152 calculates an SOC of the battery maintained during the rest period, and generates a battery SOC graph, which gradually decreases from an SOC of the battery right before the rest period. In an example, the preprocessor 152 calculates the SOC of the battery maintained during the rest period using linear interpolation from the SOC right before and an SOC right after the rest period. In this case, a decreasing rate of the SOC of the battery may be calculated based on relationship between the rest period and the temperature data. When the SOC of the battery maintained during the rest period is calculated, the preprocessor 152 divides the SOC of the battery into the data intervals, cumulatively count a time in which the SOC of the battery for each data interval is sustained, and generate a battery SOC histogram during the rest period.

A time-SOC of the battery graph during the rest period and the battery SOC histogram during the rest period obtained by preprocessing the time-SOC of the battery graph in the form of a histogram is seen in FIG. 7.

In an example, the accumulator 154 inputs the preprocessed histogram to the SOH estimation model 158 based on an NN. In an example, an ambient temperature histogram during the rest period and the battery SOC histogram during the rest period may be set as a parameter for reflecting the aging degree during the rest period of the battery. The SOH estimation model 158 based on an NN may estimate the SOH of the battery.

Figure 8:
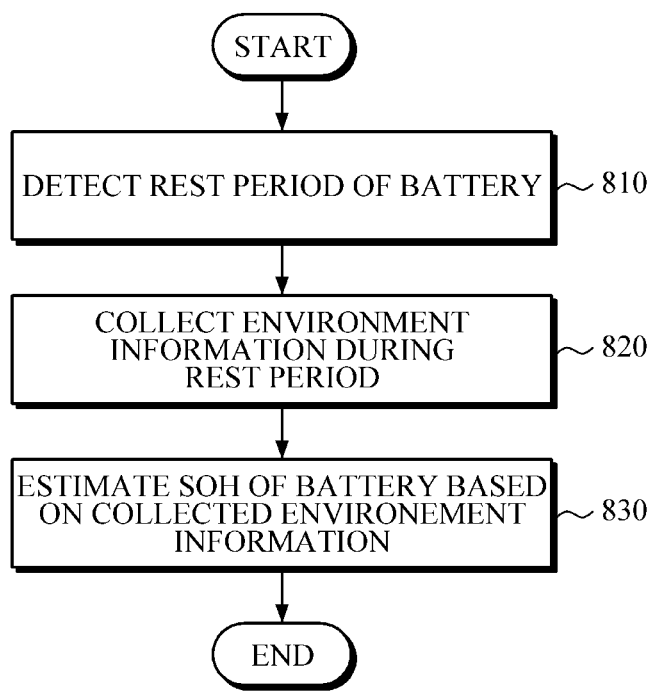
FIG. 8 is a diagram illustrating an example for describing a battery management method.

FIG. 8 is a diagram illustrating an example for describing a battery management method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. In addition to the description of FIG. 8 below, the above descriptions of FIGS. 1-7, are also applicable to FIG. 8, and are incorporated herein by reference. Thus, the above description may not be repeated here. Referring to FIGS. 2 and 8, a battery management method in consideration of a rest period of a battery using the battery management apparatus 100 shown in FIG. 2 will be described.

In 810, the rest period detector 110 detects a rest period of the battery. As an example, when an ignition switch of an EV is turned on, the rest period detector 110 detects the rest period of the battery. For example, the rest period may be one or more of a period in which the battery is allowed to stand in the standby state and a period in which the battery management apparatus 100 is not operated.

As one example, when the battery is reactivated, the rest period detector 110 detects a battery standby time or the period in which the battery is allowed to stand as the rest period. As another example, the rest period detector 110 detects the period in which the battery management apparatus 100 is not operated or the period in which the battery management apparatus 100 is operated but an SOC of the battery is not estimated as the rest period. The rest period of the battery is a state in which the power of the battery management apparatus 100 is turned off. In this case, when the power of the battery management apparatus 100 is turned on, the rest period detector 110 may detect a period which is from a time at which the battery management apparatus 100 is deactivated to a time at which the battery management apparatus 100 is reactivated as the rest period of the battery.

In 820, the environment information collector 140 collects environment information during the rest period. For example, the environment information collector 140 may collect ambient environment information of internal environment information during the rest period of the battery.

According to an example, the environment information collector 140 transmits position information and rest period information of the EV to a server, and collect the ambient environment information corresponding to the position information during the rest period from the server. As one example, the environment information collector 140 may periodically receive a position of the EV from the GPS or by using the Wi-Fi. In another example, the environment information collector 140 may use the last position information of the EV, which is received before the EV is turned off.

According to an example, the environment information collector 140 may collect the internal environment information of the battery by operating a sensor of the battery. As one example, the environment information collector 140 may set the battery management apparatus 100 to wake-up periodically during the rest period. In another example, the environment information collector 140 may previously set any sensor in the battery to periodically sense data even when the battery management apparatus 100 is not operated. In an example, when the battery is used less than a threshold value or when the battery management apparatus 100 is woken up within a predetermined time, the rest period of the battery is considered to be maintained.

In 830, the SOH estimator 150 estimates an SOH of the battery based on the collected environment information. For example, the SOH estimator 150 estimates the SOH of the battery using data input during a usage period of the battery, and updates the estimated SOH of the battery by reflecting an aging degree of the battery during the rest period based on the SOC of the battery maintained during the rest period and the collected environment information.

Figure 9:
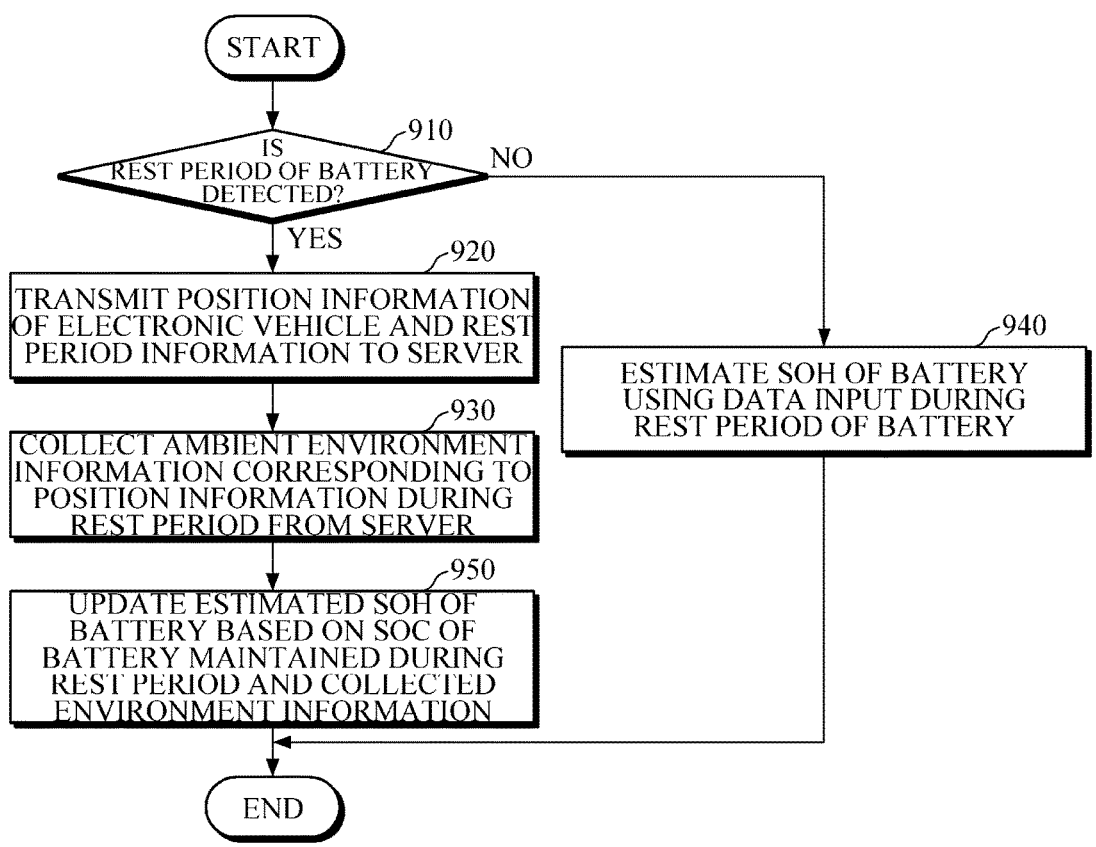
FIG. 9 is a diagram illustrating an example for describing a battery management method using ambient environment information.

FIG. 9 is a diagram illustrating an example for describing the battery management method using ambient environment information. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. In addition to the description of FIG. 9 below, the above descriptions of FIGS. 1-8, are also applicable to FIG. 9, and are incorporated herein by reference. Thus, the above description may not be repeated here. An example in which the environment information collector 140 collects the ambient environment information will be described in detail with reference to FIGS. 3 and 9.

In 910, the rest period detector 110 determines whether a rest period of a battery is detected. As an example, when an ignition switch of an EV is turned off, the rest period detector 110 may detect the rest period of the battery.

When the rest period of the battery is detected, in 920, the environment information collector 140 may transmit position information of the EV and rest period information of the battery (a battery standby time) to an external server. The environment information collector 140 communicates with the external server, for example, a meteorological office, a portal site, etc. in a wired or wireless method.

In 930, the environment information collector 140 collects ambient environment information corresponding to the position information during the rest period from the server. For example, when the EV is parked and a predetermined time passes, temperature data for each time and each date of a region in which the EV is located is collected. In an example, the ambient environment information may include the temperature information and weather information of the region in which the EV is located. For example, the ambient environment information may include data such as, for example, a temperature, a humidity, a fine dust concentration of the region in which the EV is located.

In an example, the environment information collector 140 modifies the ambient environment information collected from the server such that it can be applied to an inside area when the EV is parked in the inside area. The kind of the ambient environment information which may be collected and a collection method of the environment information collector 140 may vary without departing from the spirit and scope of the illustrative examples described.

In 950, the SOH estimator 150 updates an estimated SOH of the battery based on an SOC of the battery maintained during the rest period and the collected environment information.

In 910, the rest period detector 110 may not detect the rest period of the battery during a usage period of the battery, and the SOH estimator 150 may estimate an SOH of the battery using data input during the usage period of the battery.

Figure 10:
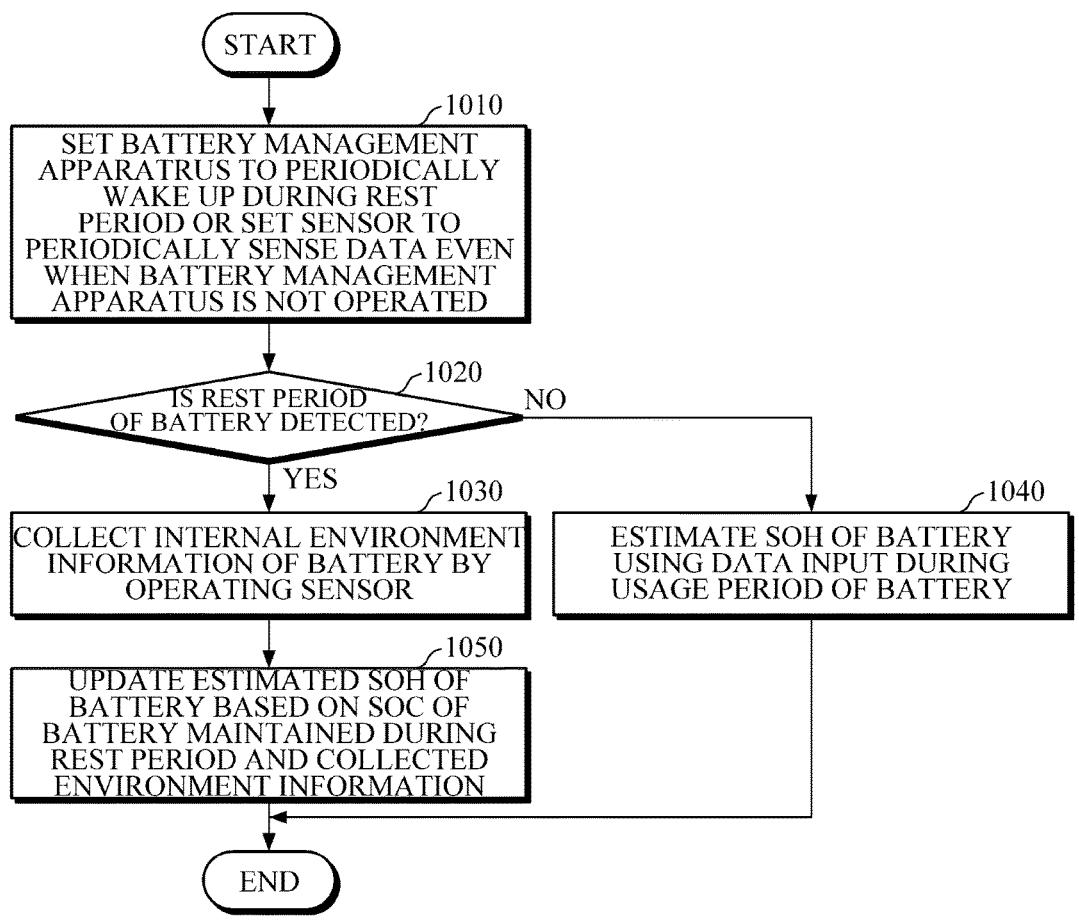
FIG. 10 is a diagram illustrating an example for describing a battery management method using internal environment information.

FIG. 10 is a diagram illustrating an example for describing an SOH estimation method using internal environment information. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. In addition to the description of FIG. 10 below, the above descriptions of FIGS. 1-9, are also applicable to FIG. 10, and are incorporated herein by reference. Thus, the above description may not be repeated here. An example in which the environment information collector 140 collects the internal environment information will be described with reference to FIGS. 3 and 10.

In 1010, the environment information collector 140 sets the battery management apparatus 100 to periodically wake up during a rest period or seta any sensor to periodically sense data even when the battery management apparatus 100 is not operated.

As one example, the environment information collector 140 sets a period in which the battery management apparatus 100 is woken up so that internal environment information is collected during the rest period. As another example, the environment information collector 140 may designate a sensing data store separate from the battery management apparatus 100 so that a specific sensor senses data even when the battery management apparatus 100 is not operated.

In 1020, the rest period detector 110 determines whether the rest period of the battery is detected. In an example, when an ignition switch of an EV is turned off, the rest period detector 110 may detect the rest period of the battery. In another example, the rest period detector 110 may detect the rest period of the battery when an ignition switch of an EV is turned on.

In 1030, when the rest period is detected, the environment information collector 140 collects the internal environment information of the battery by operating the sensor(s). In an example, the internal environment information includes a temperature, a humidity, a voltage, and a current of the battery.

In 1050, the SOH estimator 150 updates an estimated SOH of the battery based on an SOC of the battery maintained during the rest period and the collected environment information.

In 1020, the rest period detector 110 may not detect the rest period of the battery during the usage period of the battery. Thus, in 1040, the SOH estimator 150 estimates an SOH of the battery using data input during a usage period of the battery.

Figure 11:
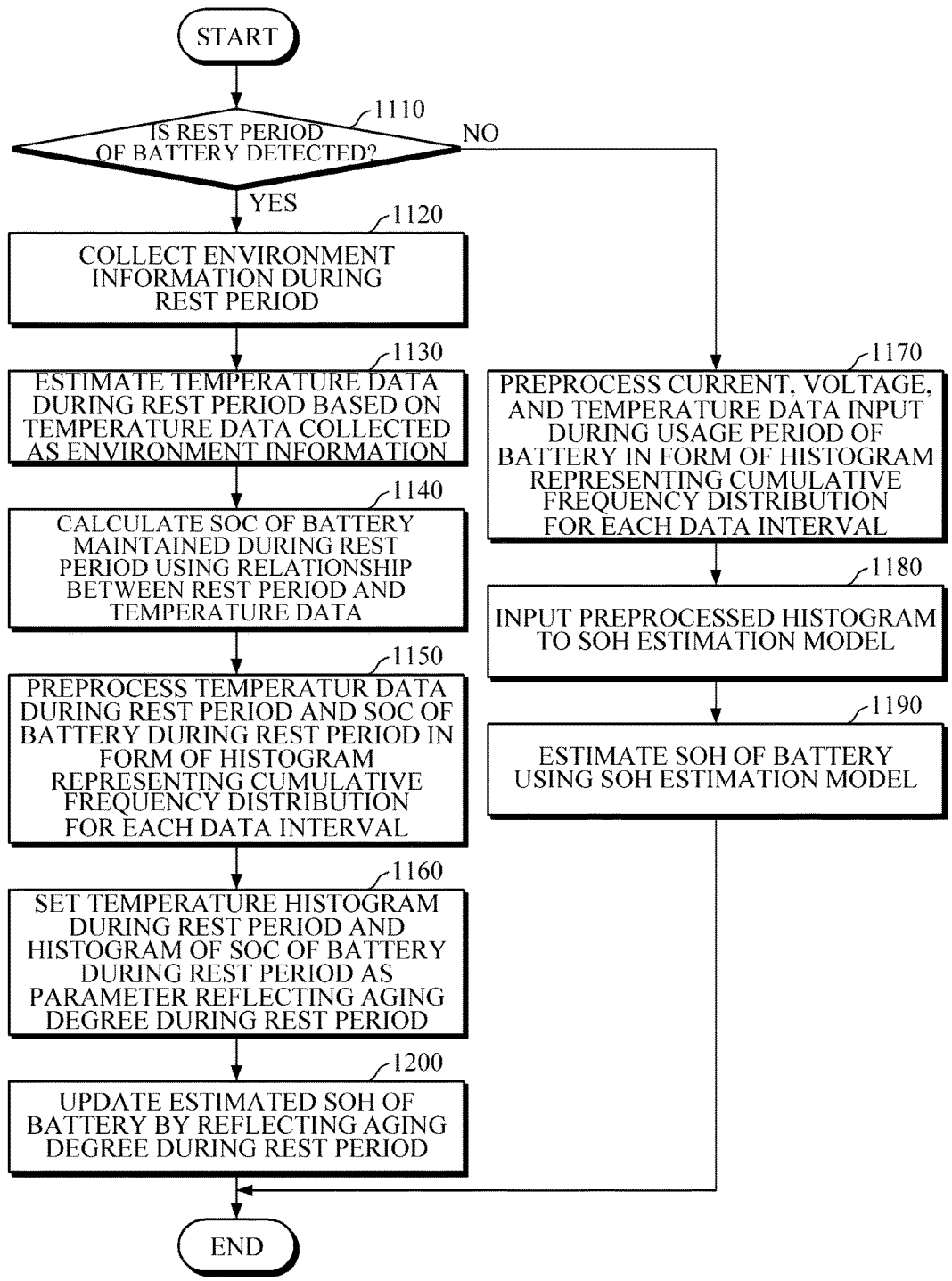
FIG. 11 is a diagram illustrating an example for describing a battery management method for estimating a state of health (SOH) of a battery.

FIG. 11 is a diagram illustrating an example for describing the SOH estimation method of estimating an SOH of a battery using an SOH estimation model. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. In addition to the description of FIG. 11 below, the above descriptions of FIGS. 1-10, are also applicable to FIG. 11, and are incorporated herein by reference. Thus, the above description may not be repeated here. FIGS. 3 and 11 illustrate an example in which the battery management apparatus 100 estimates the SOH of the battery by reflecting an aging degree of the battery based on environment information collected during a rest period.

In 1110, the rest period detector 110 determines whether a rest period of a battery is detected. In an example, when an ignition switch of an EV is turned off, the rest period detector 110 may detect the rest period of the battery. In 1120, when the rest period is detected, the environment information collector 140 collects environment information during the rest period.

In 1130, the preprocessor 152 estimates temperature data during the rest period based on temperature data collected as the environment information. In an example, when the temperature data is periodically collected, the preprocessor 152 may estimate temperature data during the rest period based on the collected temperature data, and generate a time-temperature data graph.

In 1140, the preprocessor 152 calculates an SOC of the battery maintained during the rest period using a relationship between the rest period and the temperature data during the rest period. In an example, the relationship information between the rest period (the battery standby time) and the temperature data may be previously measured or input. In an example, the preprocessor 152 calculates a capacity maintenance ratio (%) after a predetermined time passes from an SOC of the battery right before the rest period of the battery, calculates the SOC of the battery maintained during the rest period, and generate a time-SOC of the battery graph during the rest period.

In 1150, the preprocessor 152 preprocesses the temperature data during the rest period and the SOC of the battery during the rest period in the form of a histogram representing a cumulative frequency distribution for each data interval. For example, the preprocessor 152 may generate a temperature histogram during the rest period and a battery SOC histogram maintained during the rest period.

In 1160, the accumulator 154 may set the temperature histogram during the rest period and the battery SOC histogram during the rest period as parameters reflecting the aging degree during the rest period. For example, the accumulator 154 stores a preprocessed histogram in the parameter store 156 as a parameter of the SOH estimation model 158. In an example, the SOH estimation model 158 may be an estimation model based one or more of an NN, a DNN, and an RBM.

In 1180, the accumulator 154 may input the preprocessed histogram to the SOH estimation model 158. In 1190, SOH estimation model 158 estimates an SOH of the battery.

In 1200, when the parameter reflecting the aging degree is set through the accumulator 154, the SOH estimation model 158 updates the estimated SOH of the battery by reflecting the aging degree during the rest period.

In 1110, the rest period detector 110 may not detect the rest period of the battery because of usage of the battery. In 1170, the preprocessor 152 preprocesses current, voltage, and temperature input during the usage period of the battery in the form of a histogram representing a cumulative frequency distribution for each data interval.

The battery management apparatus 100, rest period detector 110, environment information collector 140, state of health (SOH) estimator 150, preprocessor 152, accumulator 154, parameter store 156, and SOH estimation model 158 described in FIGS. 2 and 3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 8-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management apparatus, comprising:
a processor configured to:
detect a rest period of a battery;
collect environment information during the rest period; and
determine a state of health (SOH) of the battery using data input during a usage period of the battery, and to update the determined SOH of the battery based on a state of charge (SOC) of the battery maintained during the rest period and the collected environment information.

2. A battery management apparatus, comprising:
a processor, the processor comprising:
a rest period detector configured to detect a rest period of the battery;
an environment information collector configured to collect an environment information during the rest period; and
a state of health (SOH) determiner configured to determine a SOH of the battery using data input during a usage period of the battery, and to update the determine SOH of the battery based on a state of charge (SOC) of the battery maintained during the rest period and the collected environment information.

3. The battery management apparatus of claim 2, wherein the rest period detector is further configured to detect the rest period of the battery, in response to an ignition switch of a vehicle being turned off.

4. The battery management apparatus of claim 2, wherein the rest period detector is further configured to detect a period in which the battery is in a standby state or a period in which the battery management apparatus is not operated as the rest period.

5. The battery management apparatus of claim 2, wherein the environment information collector is further configured to transmit position information of a vehicle and the rest period of the battery to a server, and to collect ambient environment information corresponding to the position information during the rest period from the server.

6. The battery management apparatus of claim 5, wherein the environment information collector is further configured to periodically receive position information from a global positioning system (GPS), or to use a last position information acquired before the rest period.

7. The battery management apparatus of claim 5, wherein the ambient environment information comprises any one or any combination of a temperature, a humidity, and a fine dust concentration.

8. The battery management apparatus of claim 2, wherein the environment information collector is further configured to collect internal environment information of the battery through a sensor.

9. The battery management apparatus of claim 8, wherein the environment information collector is further configured to set the battery management apparatus to periodically wake up during the rest period and to collect the internal environment information of the battery.

10. The battery management apparatus of claim 8, wherein the environment information collector is further configured to periodically operate the environment information collector to collect the internal environment information of the battery, in response to the battery management apparatus not being operated.

11. The battery management apparatus of claim 2, wherein the SOH determiner comprises a preprocessor configured to preprocess any one or any combination of the SOC of the battery maintained during the rest period and the collected environment information as a histogram representing a cumulative frequency distribution for each data interval.

12. The battery management apparatus of claim 11, wherein the preprocessor is further configured to calculate the SOC of the battery maintained during the rest period from an SOC before the rest period and an SOC after the rest period using linear interpolation.

13. The battery management apparatus of claim 12, wherein the preprocessor is further configured to calculate a decreasing rate of the SOC of the battery maintained during the rest period using a relationship between the rest period and temperature data of the battery in the collected environment information.

14. The battery management apparatus of claim 11, wherein the SOH determiner is further configured to set the histogram of the preprocessed SOC of the battery and the histogram of the preprocessed environment information as a parameter reflecting a degree of aging during the rest period.

15. A battery management method, comprising:
   detecting a rest period of a battery;
   collecting environment information during the rest period; and
   determining a state of health (SOH) of the battery by estimating the SOH using data input during a usage period of the battery and updating the estimated SOH of the battery based on a state of charge (SOC) of the battery maintained during the rest period and the collected environment information.

16. The battery management method of claim 15, wherein the collecting of the environment information comprises transmitting position information of a vehicle and the rest period of the battery to a server, and collecting ambient environment information corresponding to the position information during the rest period from the server.

17. The battery management method of claim 15, wherein the collecting of the environment information comprises operating a sensor to collect internal environment information of the battery.

18. The battery management method of claim 15, wherein the determining of the SOH of the battery further comprises calculating the SOC of the battery maintained during the rest period from an SOC before the rest period and an SOC after the rest period using linear interpolation.

19. The battery management method of claim 15, wherein the determining of the SOH of the battery comprises preprocessing any one or any combination of the SOC of the battery maintained during the rest period and the collected environment information as a histogram representing a cumulative frequency distribution for each data interval.

20. The battery management method of claim 19, wherein the determining of the SOH of the battery comprises setting a histogram of the preprocessed SOC of the battery and a histogram of the preprocessed environment information as a parameter reflecting an aging degree during the rest period.

* * * * *